June 9, 1936.    J. W. ANDERSON    2,043,218
WINDSHIELD WIPER
Filed Nov. 14, 1931
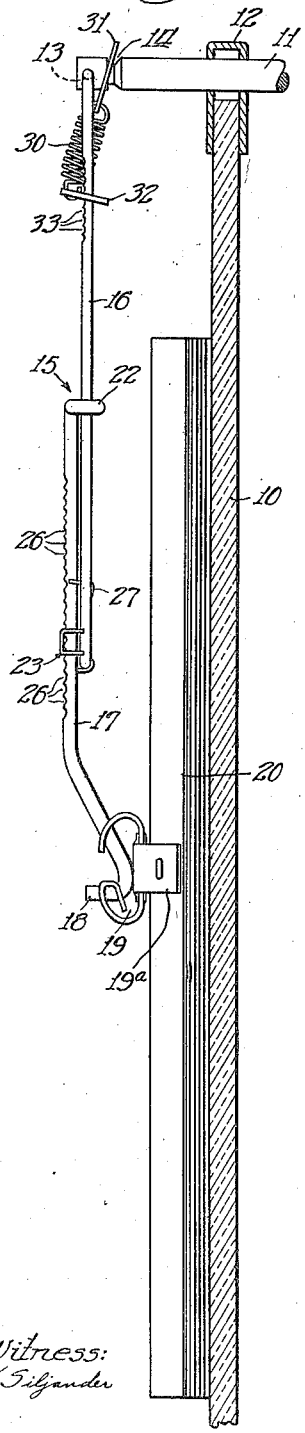
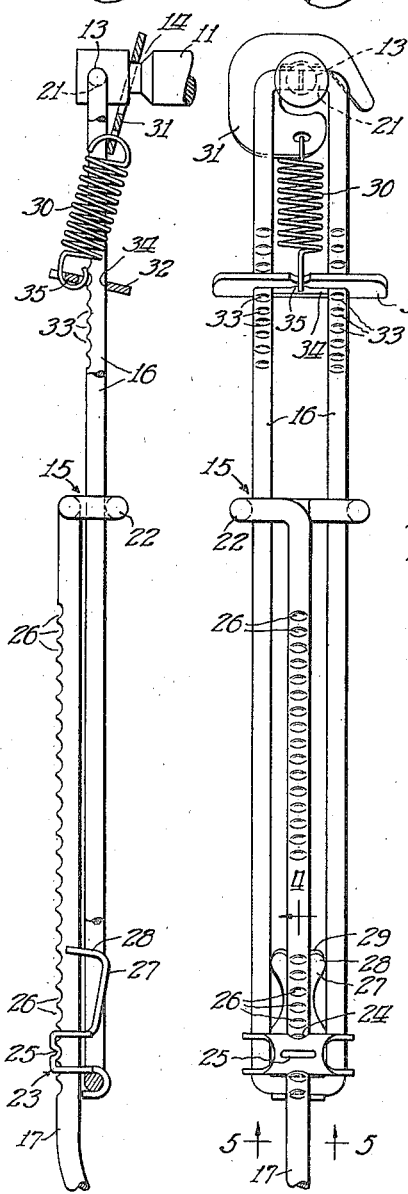
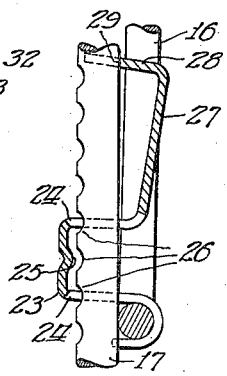
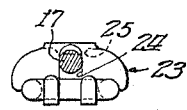
Inventor
John W. Anderson
By Hill & Hill, Attys.
Witness:
V. Siljander Patented June 9, 1936

2,043,218

UNITED STATES PATENT OFFICE 2,043,218

WINDSHIELD WIPER

John W. Anderson, Gary, Ind.

Application November 14, 1931, Serial No. 574,967

5 Claims. (Cl. 287—58)

This invention relates to a windshield wiper, and particularly to the arm thereof by which the wiping element is supported and operatively connected to an actuating member, such as a shaft or other suitable device.

One object of the present invention is to provide a sectional wiper arm which may be readily adjusted to various lengths for positioning the wiping element at various distances from the actuating member, and to provide simple and efficient means for yieldingly maintaining the respective sections of the arm in various positions of adjustment.

Another object of the invention is to provide a wiper arm having resilient means associated therewith for urging the arm and wiping element toward the windshield, and wherein a novel construction and arrangement is provided for varying the tension of said resilient means.

Another object of the invention is to provide a wiper arm strong enough to carry loads encountered in service without breakage of the arm adjacent to the shaft or other actuating member.

Another object of the invention is to provide a wiper arm which can be readily and securely attached to the actuating member without the use of tools and which is then locked or secured against detachment from the actuating member.

A further object of the invention is to provide a wiper arm which may be readily applied to and disconnected from its actuating member, and wherein the resilient means associated with the arm may be conveniently positioned, and the tensioning means therefor readily adjusted.

A still further object of the invention is to improve devices of the character described in sundry details hereinafter referred to and particularly pointed out in the appended claims.

One embodiment of the present invention is shown for illustrative purposes in the accompanying drawing in which, Fig. 1 is a side view of my improved wiper arm illustrating its application to a wiping element and actuating member operatively related to a windshield;

Fig. 2 is an enlarged side view of the improved arm shown in Fig. 1 with some of the parts broken away to more clearly illustrate certain of the structure;

Fig. 3 is a front elevation of the structure shown in Fig. 2, taken as viewed from the left side thereof;

Fig. 4 is an enlarged longitudinal sectional view taken substantially as indicated by the line 4—4 of Fig. 3; and Fig. 5 is a transverse sectional end view taken substantially as indicated by the line 5—5 of Fig. 3.

In the drawing 10 designates a windshield having a wiper arm actuating member 11 shown, in the present instance, as a shaft rotatably mounted in the frame 12 of the windshield, and provided with a transversely extending aperture or recess 13 and a groove 14 shown, in the present instance, as formed in the periphery of and extending around the shaft 11 in spaced relation to the aperture.

My improved wiper arm indicated as a whole by the numeral 15 comprises an inner section 16 and an outer section 17 slidably mounted on the inner section and extending beyond the lower end thereof, the extreme outer or lower end of the outer section 17 being provided in the present instance with a hook portion 18 adapted to engage a connector, indicated as a whole by the numeral 19, on which is mounted a clip or holder 19ª adapted to receive a windshield wiper element or blade 20 positioned and adapted for engagement with the surface of the windshield 10.

The inner section 16 of the wiper arm 15 is shown in the present instance as formed of relatively stiff resilient round stock or wire bent into U-shaped formation and provided adjacent its upper end with inwardly extending portions or projections 21 adapted to engage the aperture 13 at opposite sides of the shaft 11 in a manner to rotate therein and permit the arm 15 to swing in a plane substantially parallel to the axial line of the shaft 11. By such an arrangement, it will be observed that the angular projections 21 of the arm 16 positioned in opposite ends of the aperture 13, divide the operating load at these points of engagement with the shaft 11 between two cross sectional areas approximately equal to the cross sectional area of the aperture, thereby obtaining greater durability than is ordinarily obtained by a structure wherein the entire load is carried by single cross sectional area of the driven member or arm as is the case in various present devices and which are subject to frequent breakage at a point near the connection of the arm and operating shaft.

For slidably mounting the outer section 17 on the inner section 16 in a manner to vary the distance between the wiping element 20 and shaft 11, the section 17 is provided adjacent its upper end with a loop portion 22 shown, in the present instance, as surrounding the legs of the U-shaped section 16 in a manner to slide thereon, and the lower end or bight portion of the section 16 is provided with a bracket indicated as a whole by the numeral 23 and having an elongated aperture 24 formed therein adapted to slidably receive the longitudinal or downwardly extending portion of the section 17, to the outer end of which is connected the wiper element 20.

For securing the section 17 and wiper element 20 in various positions of adjustment with respect to the section 16 and shaft 11, the bracket 23 is provided with a detent 25 adapted to engage a roughened portion on the outer section 17, said roughened portion being shown, in the present instance, as a plurality of notches 26 spaced longitudinally of the member 17 on the side thereof, adjacent the detent 25, and for urging the notched or roughened side of the section 17 toward the detent 25, the bracket 23 is provided with a resilient flat spring arm portion 27 having a laterally extending end portion 28 formed thereon provided with a notch 29 adapted to receive the section 17 of the arm 15 and in conjunction with the loop 22 and elongated opening 24 formed in the bracket 23 to assist in maintaining the inner and outer sections 16 and 17, respectively in substantial alignment.

It will be observed that by such an arrangement, the notches 26 may be yieldingly held in engagement with the detent 25 and that, due to the yielding of the resilient spring 27 to permit the high points between the notches 26 to pass over the detent 25, the outer section 17 may be readily positioned with respect to the inner section 16 as desired.

For yieldingly urging the wiper arm 15 and wiping element 20 toward the windshield 10, a spring 30 is connected at one of its end portions to an open sided hook 31 adapted to engage the groove 14 as clearly shown in Figs. 1 and 2, and at its opposite end, is connected to a yoke 32 slidably mounted on and operatively related to the inner section 16 at a point remote from the pivotal axis thereof.

For varying the tension of the spring 30 in a manner to vary the pressure of the wiping element 20 on the windshield 10, the inner section 16 of the arm 15 is provided with a roughened portion shown in the present instance as a plurality of notches 33 formed in the respective leg portions of the U-shaped inner section 16 and spaced longitudinally thereof. The yoke member 32 is shown, in the present instance, as provided with a central opening 34 adapted to loosely receive the legs of the inner section 16 in a manner to prevent rotation of the yoke on the inner section, and it will be observed that by connecting the spring 30 to one side of the yoke 32 as clearly shown at 35 in Figs. 2 and 3, that the tension of the spring 30 will cause a cramping of the yoke on the section 16 and cause one of the margins of the opening 34 to engage the notches 33 and retain the yoke in relatively fixed position with respect to the arm section 16. It will be observed also that by moving the yoke 32 longitudinally of the section 16 in a manner to engage the various notches 33 formed therein, that the spring 30 may be variously tensioned for exerting various degrees of pressure of the wiping element 20 on the windshield 10.

In assembling the arm 15 with the shaft 11, the outer section 17 may be moved downwardly to adjacent its extreme outer position and the yoke 32 slid downwardly along the inner section 16 to adjacent the loop 22 of the arm, thereby permitting the free ends of the member 16 to be separated and the inwardly extending projections 21 inserted in opposite ends of the aperture 13, after which the yoke may be moved upwardly into approximately its normal operative position adjacent the roughened portion or notches 33 and the hook 31 placed in the groove 14, after which the outer section 17 of the arm may be moved to desired position and the yoke adjusted to proper position in one of the notches 33 to obtain the desired spring tension for exerting suitable pressure of the wiper blade 20 on the surface of the windshield. It will be observed that by such an arrangement, the projections 21 are secured against accidental displacement from within the aperture 13 and that an efficient and secure connection between the arm and operating shaft is obtained which prevents the arm from working out of the aperture as frequently occurs in various devices at present in use.

It will be observed from the foregoing description that the present invention provides a novel and efficient structure whereby the wiper arm may be adjusted to various lengths for variously positioning the wiper element with respect to its actuating member, and that the pressure of the wiper element on the windshield may be readily varied. It will be observed also that the arm and the pressure varying means may be readily applied to and disconnected from its actuating member for convenience in making replacements or repairs of the various parts.

Obviously, the present invention is not limited to the precise construction and arrangement shown and described, as the same may be variously modified. Moreover, all the features of the invention need not be used conjointly, as the same may be used to advantage in variously different combinations and sub-combinations.

Having thus described my invention, what I claim as new and desire to cover by Letters Patent is:

1. In a device of the class described, a windshield wiper arm comprising an inner section, an outer section having notches formed in one side thereof slidably mounted on said inner section, a bracket mounted on the inner section, said bracket having a detent formed integrally therewith and engageable with the notches formed in said outer section for maintaining the sections in various adjusted positions with respect to each other, and resilient means carried by said bracket and engageable with said outer section for urging the notched side thereof toward said detent.

2. In a device of the class described, a windshield wiper arm comprising an inner section, an outer section having means adjacent one of its ends engageable with and slidable on said inner section, said outer section having notches formed in one side thereof, a bracket mounted adjacent one end of said inner section and having an elongated opening formed therein for slidably receiving said outer section, a detent formed on said bracket adjacent said outer section, and resilient means operatively related to said bracket and engageable with said outer section for urging the notched side thereof toward said detent.

3. In a device of the class described, a windshield wiper arm comprising an inner section, an outer section slidably mounted on said inner section and extending beyond the end thereof, a bracket mounted on one of said sections, and resilient means on said bracket and engageable with the other of said sections for urging said other of the sections against a portion of said bracket for maintaining the sections in various adjusted positions with respect to each other.

4. In a device of the class described, a windshield wiper arm comprising a substantially U-shaped inner section adapted to be pivotally mounted on an actuating member, an outer section having an elongated loop formed adjacent one of its ends engageable with and slidable on said inner section, said outer section having notches formed in one side thereof, a bracket mounted adjacent the lower end of said inner section and having an elongated opening formed therein for slidably receiving said outer section, a detent formed on said bracket adjacent the notches on said outer section, and resilient means operatively related to said bracket and engageable with said outer section for urging the notched side thereof toward said detent.

5. A windshield wiper arm comprising in combination a plurality of spaced legs, a blade carrying extension slidably mounted thereon and having a slidable connection with two of said legs, means providing a second slidable connection between said legs and said extension, and resilient means cooperatively related to said legs and said extension for retaining the legs and said extension in a plurality of predetermined relative positions.

JOHN W. ANDERSON.